Patented Aug. 11, 1942

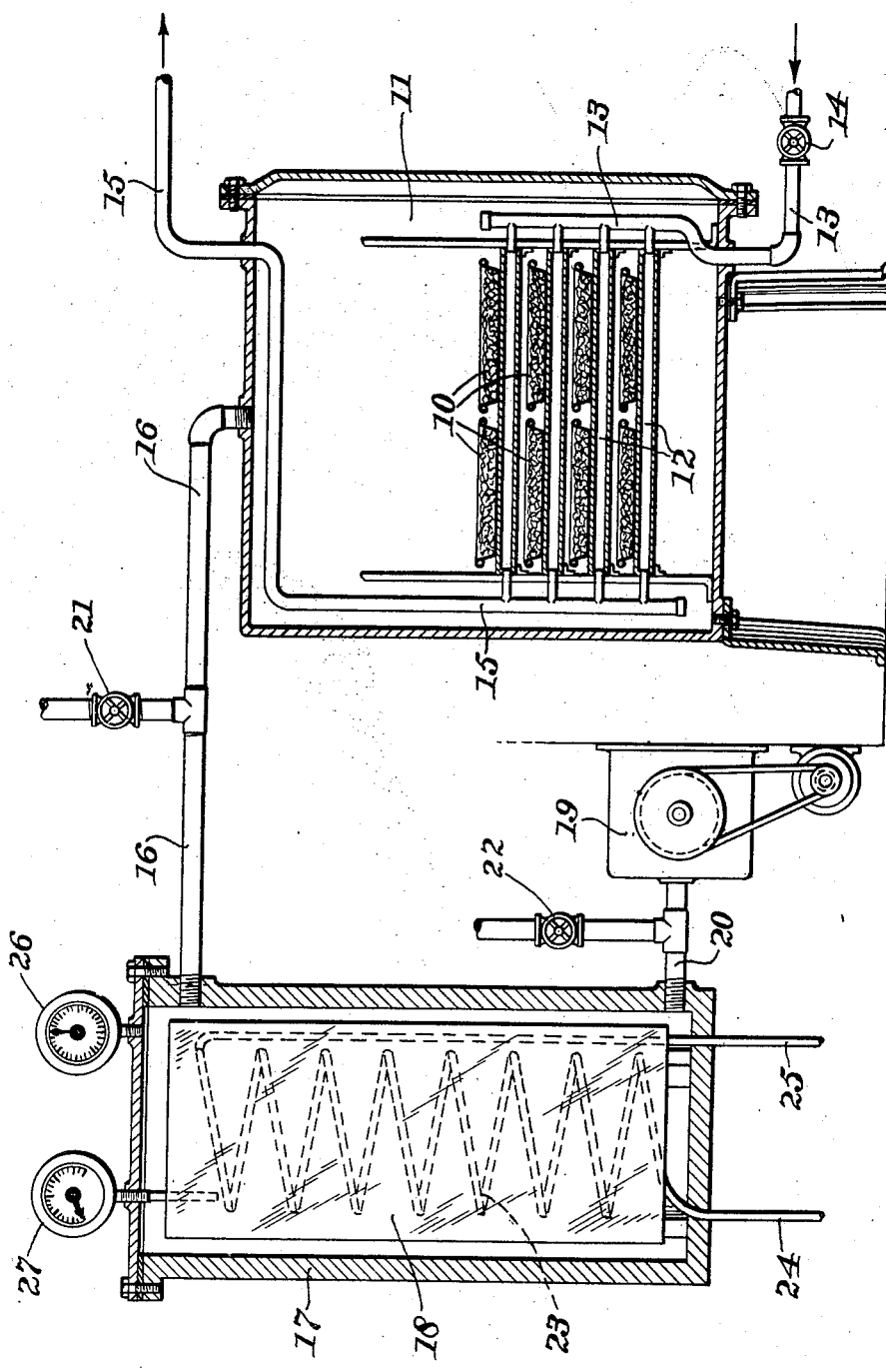

2,292,447

UNITED STATES PATENT OFFICE 2,292,447

DEHYDRATING PROCESS

James C. Irwin, Jr., Kansas City, Mo., assignor to United States Cold Storage Corporation, Wilmington, Del., a corporation of Delaware, and D. C. Pfeiffer and J. M. Hill, both of Dallas, Tex.

Application April 22, 1941, Serial No. 389,713

6 Claims. (Cl. 99—199)

This invention relates to a process for drying food products and to the product obtained from a practice of this process.

The fundamental process comprehends freezing any food product containing a large proportion of water and subjecting such frozen food substances to a low pressure sufficient to cause the ice to evaporate or sublime directly into water vapor.

It is well known that certain materials containing a large percentage of water can be dried in this manner and the present invention resides in an improvement on the prior art methods.

The drawing discloses a diagrammatic form of an apparatus which may be used to perform the herein disclosed process.

The typical products dried by this process are coffee, egg whites, milk, potatoes, yeast, etc. The food or other product to be dried is frozen in any suitable manner as by placing it in a cold storage room or by disposing the material in the vacuum chamber of the drying apparatus. In either method, the food is frozen solid in a relatively thick layer either by the loss of heat in the cold chamber or by the evaporation of water from the food itself in the vacuum chamber of the machine.

The frozen food product is then placed on suitable supporting means in the vacuum chamber and is subjected simultaneously to a high degree of vacuum and the addition of heat which causes the ice to sublime, the supply of heat being regulated to an amount equal to the loss of heat occasioned by the evaporation or sublimation of the ice in the food product. The evaporation and heating is continued until approximately 95 to 98 per cent of the moisture contained in the food product is removed, at which point the rate of cooling occasioned by the evaporation of the ice becomes somewhat slower. When this stage of the drying process is reached, the temperature of the product being dried begins to rise above a freezing temperature and as the degree of heat supplied to the food product is continued at substantially the same level, during the final stages of drying when the last 2 to 5 per cent of the moisture remaining in the food is removed, the temperature of the food is raised materially and is substantially equal to that of the heat supply whereby the residual moisture is rapidly removed.

As a typical example of one method of performing the present invention, blanched potatoes may be sliced approximately three-eighths of an inch thick and the slices are placed in a pan 10 in a single layer. The potatoes may be frozen in a cold room or placed in the vacuum chamber 11 of the machine and after being subjected to a relatively low pressure may be frozen in approximately one-half hour's time by evaporation of the water from the potatoes. The vacuum is maintained at such a pressure as will cause the potatoes to freeze at a temperature of about 20 to 25° F. and after freezing, the potatoes are maintained at this temperature for approximately 24 hours, during which time the largest part of water is evaporated. The potatoes in pans 10 are placed on the trays or supporting shelves 12 in the vacuum chamber 11.

The shelves 12 are hollow to receive the heating medium which is supplied through inlet header 13 and the flow of this fluid is controlled by an inlet valve 14. The individual shelves are each connected to the inlet header 13, and the heating fluid will flow from the inlet 13 through the shelves to the outlet header 15. The heating fluid may then be carried to any suitable overflow or storage system. In the present instance, where potatoes are being dried, the heating fluid is preferably brine-heated to 60° F.

The potatoes are maintained in the vacuum chamber at a pressure of between .8 mm. to 1.5 mm. by the apparatus described hereinafter. At this pressure and by maintaining the temperature of the potatoes at approximately 20° to 25° F., the layer is almost completely dried in about 24 hours. At that time, the temperature of the potatoes will rise as above explained and the additional heat thus supplied to the layer of potatoes causes the residual moisture to be more rapidly evaporated. The drying is continued at this higher temperature to remove this remaining residual moisture.

In order to maintain the required degree of vacuum, the vacuum chamber 11 is connected by a conduit 16 to the chamber 17 which contains a large body of silica gel 18. The chamber 17 has any suitable conventional vacuum producing means 19 connected thereto by pipe 20, for removing air and other vapors from the chamber 17 which are not condensed by the silica gel. A bleed valve 21 may be disposed in the conduit 16 and a valve 22 is associated with the inlet 20 to the vacuum pump. The body of the silica gel 18 is cooled by means of a coil 23 having an inlet 24 and outlet 25, through which a cooling medium is circulated to absorb the heat liberated in the silica gel when the water vapor condenses therein as will be explained below. The chamber 17 may have a suitable pressure gage 26 connected thereto and a thermometer 27 is operatively associated with the body of the silica gel.

The operation of this apparatus is as follows: The potatoes after being frozen in trays 10 and disposed in the vacuum chamber 11, are subjected to a vacuum when the operation of pump 19 is initiated. After all the air and other non-condensable gases are removed from the chamber 11, conduit 16, and chamber 17, the pressure is reduced to approximately .80 mm. to 1.5 mm. at which pressure the ice in the frozen potatoes will be evaporated directly to water vapor and conveyed through conduit 16 to the body of silica gel 18. As soon as the water vapor contacts the silica gel, it is condensed to a liquid of much smaller volume than the vapor to maintain the low pressure already established. As the water in the form of ice evaporates from the potatoes, the food is cooled and therefore to prevent the temperature falling below 20° to 25° F., heat is supplied to the layer of potatoes by circulating a fluid at approximately 60° F. through the shelves 12 upon which the trays of potatoes are disposed. The quantity of heated fluid circulated is just sufficient to supply the amount of heat necessary to make up for the cooling caused by evaporation and the water is controlled by valve 14.

In the example given, the potatoes are subjected to this reduced pressure and below freezing temperature for a period sufficient to remove the most of the contained water. Then the temperature is raised to remove the residual moisture.

The point at which the rate of cooling caused by the evaporation of moisture from the food drops off quite materially, as evidenced by the temperature rise, is a characteristic point and is found in all materials containing a large percentage of water and dried in accordance with the present teachings. If the product is not maintained below a freezing temperature until this point is reached, it has been found that the dried food cannot be reconstituted by the mere addition of water to have all the original properties of the food. However, if the temperature is maintained below freezing until this point is reached, the temperature may be raised during the remainder of the drying process without detrimental results to the dried food, this rise in temperature being sufficient to cause a rapid evaporation of the residual 2 to 5 per cent of moisture within a much shorter period than has ever been known to the prior art. After this characteristic point is reached, in any material being dried, its temperature may be raised to the temperature of the heating fluid to effect the removal of the residual moisture without any change in the ability to reconstitute the dried food product.

The specific example given above as applied to potatoes may be duplicated to remove large quantities of water from any food product. The specific temperature conditions and time of drying may be varied, but the same principles will be found to apply to all such products and the characteristic point at which the temperature is raised, will be always encountered at that stage in the drying process when substantially all of the water has been removed.

With any product, the material may be frozen in a cold room or by evaporation in the vacuum chamber 11 and the freezing may be rapid or slow, the rate of freezing apparently not being important in the final product. In the drying of all foods, the temperature of the food is raised in the final stages to accomplish the more rapid removal of the residual moisture.

Egg whites dried in accordance with this process may be rapidly reconstituted by the addition of an appropriate amount of water and the reconstituted product is comparable in all respects to fresh egg whites. The reconstituted whites may be whipped to a froth and may be used in cooking recipes and for all other uses of a fresh egg white. A notable example of the ability of the egg white dried in accordance with this teaching to be used as distinguished from egg whites dried by prior art methods is that the present product may be used in making an angel food cake which use cannot be made of any of the other known dried egg products.

The egg white dried by this process may be stored for any length of time without the previous fermentation of the prior art methods and it also lacks the characteristic odor of dried egg albumen of the previously dried materials. Again, it may be reconstituted very rapidly as distinguished from the long period of reconstitution required with the old dried egg whites.

Coffee which has been brewed according to the conventional methods may be subjected to the drying process of this invention and the dried material is highly resistant to caking, is immediately soluble in water, and has been found to retain the aroma and taste of the original brand used in brewing the coffee. It is preferred to concentrate the coffee by conventional methods before subjecting it to the present drying process. However, this is unimportant as far as the characteristics of the final product are concerned, and is done merely to save operating expenses in removing the large quantities of water present in the coffee drink.

Spinach may be dried by this process, being first blanched, the fresh whole leaf is frozen and subjected to the vacuum removal of moisture. The final product has a pale green color and a characteristic odor. It may be readily reconstituted by immersion in water, and has the original color, texture, and taste of fresh spinach. An important advantage of using this process to dry spinach and similar foods is that any damage to the vitamin contents is minimized.

Yeast dried in accordance with the present teaching has been found to retail all of the properties of the fresh material. As distinguished from a fresh yeast material, the dried product of this process may be stored indefinitely then reconstituted to have its original levening properties. When compressed yeast is stored for any period it loses its potency day by day and by the end of seven days it has lost a great part of its efficiency. The dried yeast product of this invention may be stored for apparently an indefinite period without regard to temperature conditions, and yet may be immediately revived to have its original properties, the organisms apparently remaining in a dormant state. The ordinary compressed yeast of commerce, is quite sensitive to freezing and thawing and can be made useless by passing through this cycle and if subjected to a relatively high temperature, as normal summer temperature, for any length of time, its potency decreases rapidly. However, the yeast dried by the present process shows no damage when subjected to freezing temperatures followed immediately by warming to room or the relatively high temperatures that destroy the ordinary compressed yeast. Further, the dried yeast of this invention may be stored indefinitely at this relatively high temperature without perceptible damage.

The above examples have been given merely to demonstrate the use of the process, it being obvious that many similar products can be subjected to the process. These examples are not intended to limit the invention beyond the scope of the following claims.

I claim:

1. The method of drying a food product containing water comprising freezing said product, subjecting said frozen product to a vacuum effective to sublime the ice without permitting it to pass through an intermediate liquid phase and for a period sufficient to remove most of the water and then raising the temperature of said frozen product while the residual water is being removed.

2. The method of drying a product containing water comprising freezing said product, subjecting said frozen product to a vacuum effective to sublime the ice without permitting it to pass through an intermediate liquid phase and for a period sufficient to remove most of the water while maintaining the temperature of said frozen product below its freezing temperature, and thereafter raising the temperature of said frozen product while the residual water is being removed.

3. The method of drying a product containing water comprising freezing said product, subjecting said frozen product to a vacuum effective to sublime the ice without permitting it to pass through an intermediate liquid phase and for a period sufficient to remove most of the water, supplying heat to said product in an amount to equal the cooling effect of such sublimation, and thereafter raising the temperature of said product while the residual water is being removed.

4. The method of drying a product containing water comprising freezing said product, subjecting said frozen product to a vacuum effective to sublime the ice without permitting it to pass through an intermediate liquid phase and for a period sufficient to remove most of the water, supplying heat to said product in an amount to equal the cooling effect of such sublimation while maintaining the temperature of said frozen product below its freezing temperature, and thereafter raising the temperature of said product while the residual water is being removed.

5. The method of drying a food product containing water comprising freezing said product, subjecting said frozen product to a vacuum effective to sublime the ice without permitting it to pass through an intermediate liquid phase and for a period sufficient to remove at least 95% of the water in the product, supplying heat to the frozen product in an amount equal to the cooling effect of such sublimation, maintaining said frozen product at least 2° F. below its freezing temperature while said large percentage of water is removed, and thereafter raising the temperature of said product to at least 50° F. while said residual water is being removed.

6. The method of drying a food product containing water comprising freezing said product, subjecting said frozen product to a pressure below 3.0 mm. of mercury for a period of time sufficient to sublime the ice from said product directly to a vapor without permitting it to pass through an intermediate phase and to remove at least 95% of the water in the product, supplying heat to the frozen product in an amount equal to the cooling effect of such sublimation, maintaining said frozen product at least 2° F. below its freezing temperature while said large percentage of water is removed, and thereafter raising the temperature of said product to at least 50° F. while said residual water is being removed.

JAMES C. IRWIN, Jr.